(12) United States Patent
Lee et al.

(10) Patent No.: US 9,207,410 B2
(45) Date of Patent: Dec. 8, 2015

(54) OPTICAL FIBER CONNECTOR ASSEMBLY

(71) Applicant: ALLIANCE FIBER OPTIC PRODUCTS, INC., New Taipei (TW)

(72) Inventors: Jhih-Ping Lee, New Taipei (TW); Yen-Hsu Lin, Taipei Hsien (TW)

(73) Assignee: Alliance Fiber Optic Products, Inc., New Taipei (TW)

( * ) Notice: Subject to any disclaimer, the term of this patent is extended or adjusted under 35 U.S.C. 154(b) by 0 days.

(21) Appl. No.: 14/453,759

(22) Filed: Aug. 7, 2014

(65) Prior Publication Data

US 2015/0177463 A1 Jun. 25, 2015

Related U.S. Application Data

(60) Provisional application No. 61/964,029, filed on Dec. 23, 2013.

(51) Int. Cl.
 *G02B 6/38* (2006.01)
 *G02B 6/26* (2006.01)
 *G02B 6/42* (2006.01)

(52) U.S. Cl.
 CPC ............ *G02B 6/3879* (2013.01); *G02B 6/26* (2013.01); *G02B 6/387* (2013.01); *G02B 6/3821* (2013.01); *G02B 6/3849* (2013.01); *G02B 6/3874* (2013.01); *G02B 6/3878* (2013.01); *G02B 6/3885* (2013.01); *G02B 6/3893* (2013.01); *G02B 6/3897* (2013.01); *G02B 6/4292* (2013.01)

(58) Field of Classification Search
 CPC ........ G02B 6/3874; G02B 6/36; G02B 6/423; G02B 6/3885; G02B 6/3849; G02B 6/4292; G02B 6/26; G02B 6/3821; G02B 6/387; G02B 6/3893; G02B 6/3897; G02B 6/3878
 See application file for complete search history.

(56) References Cited

U.S. PATENT DOCUMENTS

| 5,481,634 A | 1/1996 | Anderson et al. |
| 6,068,410 A * | 5/2000 | Giebel et al. ............... 385/72 |
| 7,588,373 B1 * | 9/2009 | Sato et al. ................ 385/53 |
| 7,712,970 B1 | 5/2010 | Lee |
| 8,152,385 B2 | 4/2012 | De Jong et al. |
| 8,308,377 B2 * | 11/2012 | Yi ........................... 385/92 |

FOREIGN PATENT DOCUMENTS

| TW | 582557 | 5/1992 |
| WO | WO2012/151175 A2 | 11/2012 |

* cited by examiner

*Primary Examiner* — Eric Wong
*Assistant Examiner* — Mary A El Shammaa
(74) *Attorney, Agent, or Firm* — Rosenberg, Klein & Lee

(57) ABSTRACT

An optical fiber connector assembly includes a receptacle, two connectors accommodated in respective accommodation grooves in the receptacle and having a respective clip located at a top side thereof for engagement with a respective retaining groove in a mating optical fiber adapter, an optical fiber cable having two optical fibers respectively mounted in the connectors, and a sliding cover covered on the receptacle and movable relative to the receptacle to elastically deform the clips and to further disengage the clips from the respective retaining grooves of the optical fiber adapter for allowing removal of the optical fiber connector assembly out of the optical fiber adapter with less effort.

10 Claims, 18 Drawing Sheets

OPTICAL FIBER CONNECTOR ASSEMBLY

This reference is based on Provisional Application Ser. No. 61/964,029, filed on Dec. 23, 2013.

BACKGROUND OF THE INVENTION

1. Field of the Invention

The present invention relates to optical fiber technology, and more particularly to an optical fiber connector assembly, which can be conveniently mounted in a mating optical fiber adapter or dismounted therefrom with one single hand with less effort.

2. Description of the Related Art

Following fast development of communication and internet technology, telephone and network facilities are for data transmission and real time communication, bringing great convenience to people. In a communication system, cables are used for transmitting electrical signal or optical signal. The transmission of optical signal is faster than the transmission of electrical signal. Optical fiber cables are commonly used for transmitting optical signal. Further, optical fiber cables have the advantages of strong anti-electromagnetic interference anti-noise ability, wide bandwidth, light weight, long distance transmission and good privacy.

Further, many different types of optical fiber connectors are commercially available. The most widely used optical fiber connectors are SC (subscriber/square/standard) connectors and LC (lucent/local/little) connectors. A LC (lucent/local/little) connector shrinks the ferrules to 1.25 mm in diameter with a fiber pitch of 6.25 mm. Two LC simplex connectors can be joined to form a duplex connector. LC optical fiber connectors are low cost, reliable and easy-to-install method to terminate fiber optic cables. Further, LC optical fiber connectors provide simplex and duplex transmission flexibility. Further, optical fiber connectors are equipped with ferrules for alignment and connection between mating optical fiber connectors. These ferrules can be made of ceramics or copper, and are adapted to act as alignment mechanisms. They have the advantages of high dimensional precision, high mechanical durability, low insertion loss and low reflective loss, minimizing optical signal loss. FIG. 14 illustrates a LC type optical fiber connector disclosed in U.S. Pat. No. 5,481,634. According to this prior art design, the optical fiber connector A includes a connector housing A1, a fiber-holding structure B located at a rear side of the connector housing A1 to hold an optical fiber cable C therein, and a spring latch A11 located on a single side surface of the connector housing A1, which is manually operable and used to lock the connector A to an associated receptacle. However, when going to disconnect the connector from the associated receptacle, the user needs to press the spring latch A11 and then pull the connector housing A1 backwards. Because the pressing direction and the pulling direction are different, it is inconvenient to disconnect the connector from the associating receptacle. Further, it is difficult to access the fingers to the spring latch A11 of one of multiple connectors that are arranged adjacent to one another.

FIG. 15 illustrates another prior design of optical fiber connector according to Taiwan Patent M582557. This design is a LC type duplex connector, which comprises a receptacle D formed of a bottom shell D1 and a top cover shell D2, an optical fiber cable C inserted into the receptacle D and surrounded by an inner jacket B1 and then a fiber-holding structure B, and two connectors A mounted in the receptacle D and connected with one respective optical fiber C1 of the optical fiber cable C. Each connector A comprises a connector housing A1 having a clip A11 at a top side thereof, a calibration tube A2 loaded with one respective compression spring A3 and mounted in the connector housing A1 and holding one respective optical fiber C1, and a boot A4 connected to the rear side of the connector housing A1 around a rear part of the calibration tube A2. After installation, the positions of the two connectors A cannot be exchanged to change the polarity of the two optical fibers C1 of the optical fiber cable C.

FIG. 16 illustrates still another prior design of optical fiber connector according to U.S. Pat. No. 7,712,970. This design of fiber optic connector is similar to that shown in FIG. 15, comprising a housing D, two connection modules A and a fiber optic cable C. The housing D is formed of a top cover shell D2 and a bottom cover shell D1. The top cover shell D2 has mounting hooks D21 and a clip D22. The bottom cover shell D1 has mounting grooves D11 respectively forced into engagement with the mounting hooks D21 of the top cover shell D2, thereby holding down the connection modules A and the fiber optic cable C in between the top cover shell D2 and the bottom cover shell D1. The user can pull the top cover shell D2 to move the mounting hooks D21 along the mounting grooves D11 and to further open the top cover shell D2 for allowing exchange of the positions of the two connection modules A. After exchange of the positions of the connection modules A, the polarity of the two optical fibers C1 of the optical fiber cable C is relatively changed. When disconnecting the optical fiber connector from the mating optical fiber adapter, the user needs to press the finger strip D22 of the top cover shell D2 to elastically deform the clips A11 of the connection modules A, and then pull the optical fiber connector backwards, complicating the operation. When pulling the optical fiber connector backwardly out of the mating optical fiber adapter, the mounting hooks D21 can be accidentally moved along the mounting grooves D11 of the bottom cover shell D1, loosening the top cover shell D2. Therefore, this design of optical fiber connector has the drawback of low structural stability. Further, the design of the finger strip D22 of the top cover shell D2 greatly increases the overall height of the optical fiber connector, and is not convenient for gripping by the fingers. When multiple optical fiber connectors are arranged close to one another, the user's fingers will be not easy to access to the finger strip D22 of the assigned optical fiber connector.

FIG. 17 illustrates still another prior design of optical fiber connector design according to U.S. Pat. No. 8,152,385. This design is a duplex fiber optic cable assembly D substantially similar to that shown in FIG. 15 with the exception that the two connectors A1 of the fiber optic connector assembly A are respectively pivotally connected to the housing D1 by a respective connection member A4 so that the two connectors A1 are respectively rotatable through 180-degrees relative to the housing D1 for change of the polarity of the optical fiber of the optical fiber cable C. However, when rotating the connectors A1, the respective optical fibers of the optical fiber cable C are respectively twisted, leading to signal transmission loss or optical fiber damage.

FIG. 18 illustrates still another prior design of optical fiber connector design according to (WIPO) WO 2011/151175 A2. This patent discloses a push-pull LC type duplex optical fiber connector design that is similar to the embodiment shown in FIG. 17 with the exception that the connector bodies A1 of the two connectors A are respectively connected to the optical fiber cable holder D3 of the receptacle D by a respective connection member A4; a clamp B2 is fastened to the rear side of the receptacle D to hold down the optical fiber cable C; the two optical fibers of the optical fiber cable C are inserted through a boot body B3 of a boot B and the clamp B2 and then respectively inserted into respective calibration tubes A2 in the connector bodies A1; the boot body B3 comprises two hook rods B31 respectively inserted into respective openings A12 in respective clips A11 at the connector bodies A1 of the two connectors A; the boot body B3 has a top opening B30 covered by a detachable cover B32 that has a bottom protruding portion (not shown) engaged into a hole D31 in the top side of the receptacle D to stop the boot body B3 from displacement relative to the receptacle D. When the user pulls the boot body B3 backwards, the hook rods B31 will be forced against respective convex surface portions of the connector bodies A1 to elastically deform the clips A11, thereby unlocking the optical fiber connector assembly from the mating optical fiber adapter.

When wishing to change the polarity of the optical fibers of the optical fiber cable C, the user can detach the detachable cover B32 from the hole D31 of the receptacle D and the top opening B30 of the boot body B3, and then pull the boot body B3 backwards to expose the optical fiber cable holder D3 of the receptacle D to the outside for allowing rotation of the boot body B3 through 180° relative to the receptacle D. Thereafter, the user can push the boot body B3 forwardly to its former position and then attach the detachable cover B32 to the top opening B30 of the boot body B3 to force its bottom protruding portion into engagement with the hole D31 in the top side of the receptacle D. This operation procedure is complicated because the user must detach the detachable cover B32 from the top opening B30 of the boot body B3 before rotating the boot body B3 through 180° relative to the receptacle D. The detachable cover B32 can get lost easily after detached from the top opening B30 of the boot body B3.

Therefore, it is desirable to provide an optical fiber connector assembly that eliminates the drawbacks of the aforesaid various prior art designs.

SUMMARY OF THE INVENTION

The present invention has been accomplished under the circumstances in view. It is therefore the main object of the present invention to provide an optical fiber connector assembly, which eliminates the drawbacks of the aforesaid prior art designs and enables the user to conveniently mount the optical fiber connector assembly in a mating optical fiber adapter or dismount the optical fiber connector assembly from the mating optical fiber adapter with one single hand with less effort, achieving the effects of low insertion force, high anti-pull force, low insertion loss and low return loss, and assuring a high level of transmission performance.

To achieve this and other objects of the present invention, an optical fiber connector assembly of the present invention comprises a receptacle that comprises a body shell and at least one accommodation groove defined in the body shell, an optical fiber cable comprising at least one optical fiber, at least one connector respectively accommodated in the at least one accommodation groove of the receptacle and insertable into a respective connector channel in an adapter housing of an optical fiber adapter, each connector comprising a connector housing insertable into one connector channel of the optical fiber adapter, a clip formed integral with and upwardly extended from a top wall of the connector housing, the clip comprising two protruding retaining portions respectively located at two opposite lateral sides thereof on the middle for engagement with respective retaining grooves in the respective connector channel of the optical fiber adapter, a press rod backwardly upwardly extended from a rear end thereof and a recessed portion located in a top wall thereof at a front side relative to the press rod, a calibration tube mounted in the connector housing for holding one respective optical fiber of the optical fiber cable and a boot surrounding a rear part of the calibration tube and connected to a rear side of the connector housing, and a sliding cover slidably coupled to the receptacle for covering the at least one connector in the receptacle. The sliding cover comprises a cover body movable relative to the receptacle between a close position to keep the at least one connector from sight and an open position to expose the at least one connector to the outside of the receptacle, and a push unit located at a front side of the cover body and adapted for pressing the clip of one respective connector. The push unit comprises at least one horizontal suspension arm and a cam located at one side of a front end of each horizontal suspension arm for positioning in the recessed portion of the clip of one respective connector. Each cam is moved over the press rod of the clip of one respective connector to elastically deform the clip and to disengage the clip from the respective retaining groove of the optical fiber adapter when the sliding cover is pulled backwards relative to the receptacle.

Preferably, the cover body of the receptacle further comprises two sliding grooves respectively longitudinally extending along two opposite lateral sides of a bottom wall thereof. Preferably, the receptacle further comprises two stop blocks respectively located at respective rear ends of two upright sidewalls of the body shell and respectively defining a front bearing surface. Preferably, the sliding cover further comprises two sliding rails respectively located at respective bottom sides of two downwardly extended side panels thereof and respectively slidably coupled to the sliding grooves of the body shell of the receptacle, a receiving chamber defined in the cover body, and a stepped bearing surface defined in the receiving chamber for stopping against the front bearing surfaces of the stop blocks of the receptacle. Further, each stop block of the receptacle further defines a rear coupling groove. The receptacle further comprises a cover shell covered on the body shell. The cover shell comprises two coupling blocks respectively engaged into the rear coupling grooves of the two stop blocks of the receptacle and a bumper disposed between the two coupling blocks and kept in flush with the front bearing surfaces of the stop blocks of the receptacle. Preferably, the receptacle further comprises a cylindrical connection member formed of two symmetrical halves and respectively connected to a middle part of a rear end of the body shell and a middle part of a rear end of the cover shell. Further, the cylindrical connection member defines therein an axial through hole in communication with the accommodation grooves of the receptacle.

Preferably, the optical fiber connector assembly further comprises an operating member for moving the sliding cover. Preferably, the receptacle further comprises two stop blocks respectively located at respective rear ends of two upright sidewalls of the body shell. The cover body of the sliding cover further comprises two downwardly extended side panels, and a transverse groove located in a top wall thereof. The operating member comprises an actuation bar slidably inserted into the transverse groove of the sliding cover, a retaining block perpendicularly extended from a bottom wall of one end of the actuation bar and a handle horizontally extended from the actuation bar at right angles and terminating in a grip.

Preferably, the sliding cover further comprises an exit hole located in the topmost edge of one side panel of the cover body in one end of the transverse groove, and a conical guide block extending along one lateral side of the transverse groove. Further, the retaining block of said operating member has a thickness larger than the thickness of the side panels of the cover body. Preferably, the receptacle further comprises two stop blocks respectively located at respective rear ends of two upright sidewalls of the body shell. Preferably, the operating member further comprises a position-limit groove located in a front side of the retaining block for abutment against the conical guide block of the sliding cover, and a stepped thrust groove located in an opposing back side of the retaining block for stopping against the stop blocks of the receptacle.

Preferably, the cover body of the sliding cover further comprises a retaining structure located in the top wall thereof at a rear side relative to said transverse groove. The retaining structure comprises a positioning trough, a first rib located in the positioning trough and extending in a perpendicular direction relative to the transverse groove, and a sectional groove extending across the first rib. The operating member further comprises an engagement unit. The engagement unit comprises a second rib located at the handle for abutment against the first rib, and a position-limit block extended from the second rib for engagement into the sectional groove in the first rib.

DETAILED DESCRIPTION OF THE PREFERRED EMBODIMENT

Figure 1:
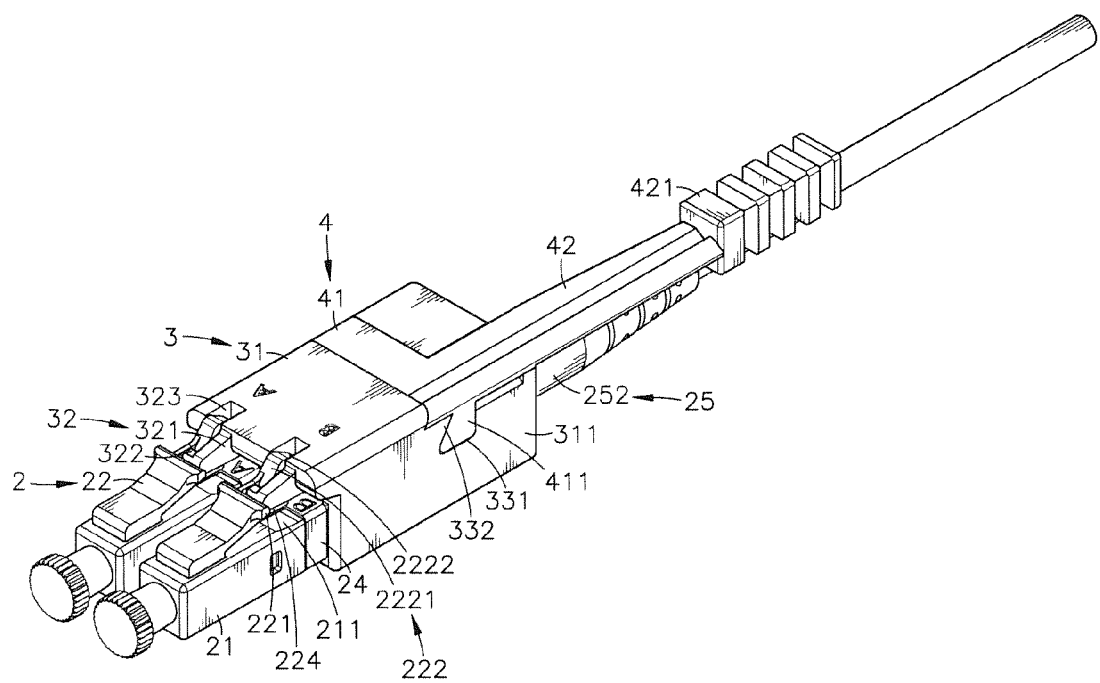
FIG. 1 is an oblique top elevational view of an optical fiber connector assembly in accordance with the present invention.
Figure 2:
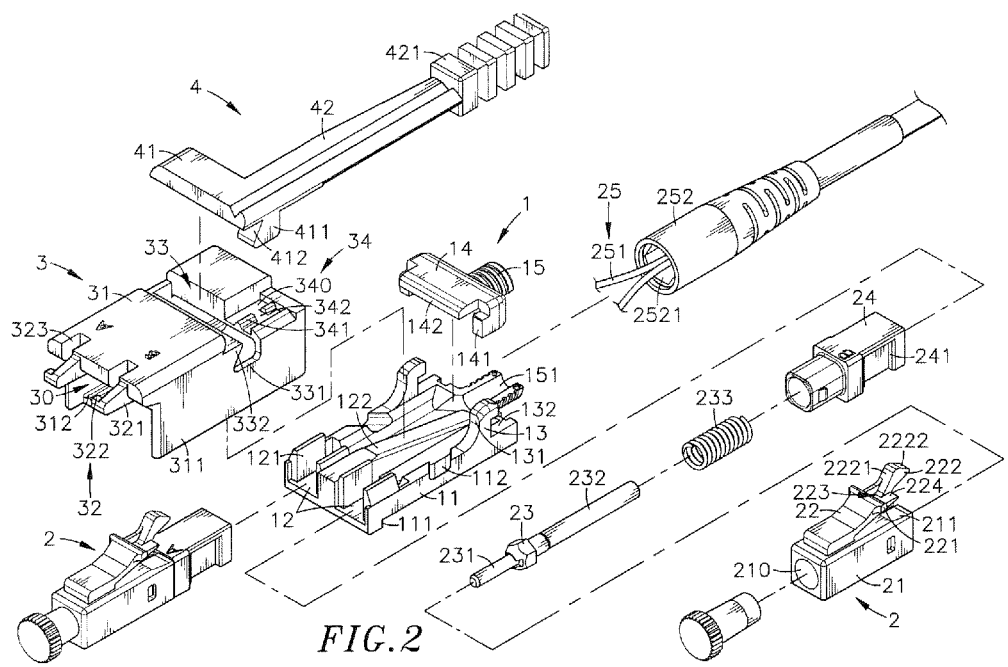
FIG. 2 is an exploded view of the optical fiber connector assembly in accordance with the present invention.
Figure 3:
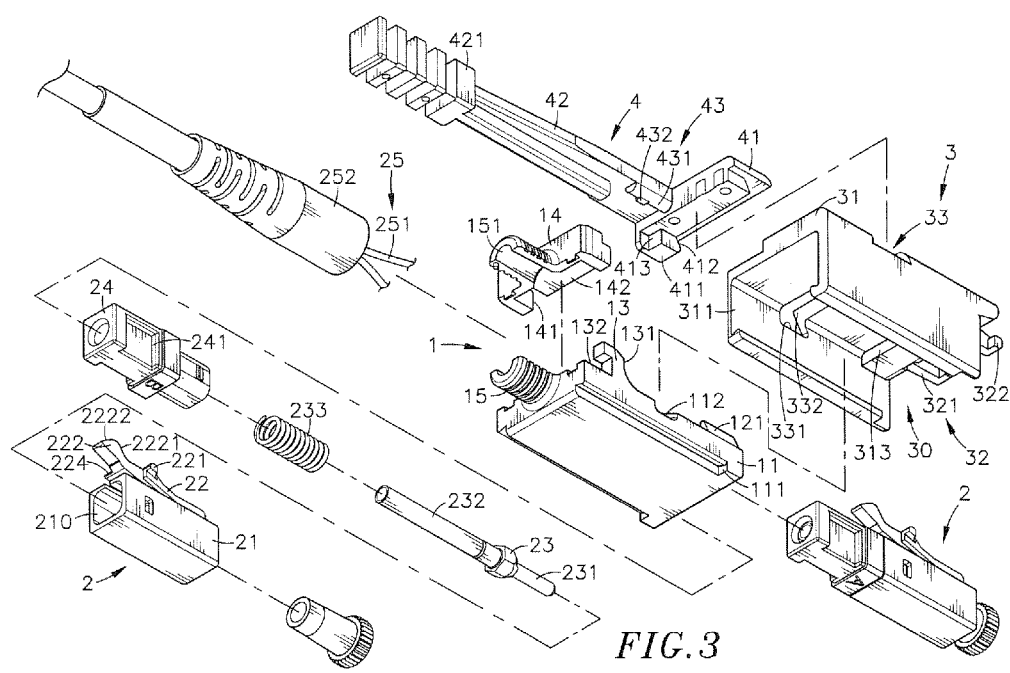
FIG. 3 corresponds to FIG. 1 when viewed from another angle.
Figure 4:
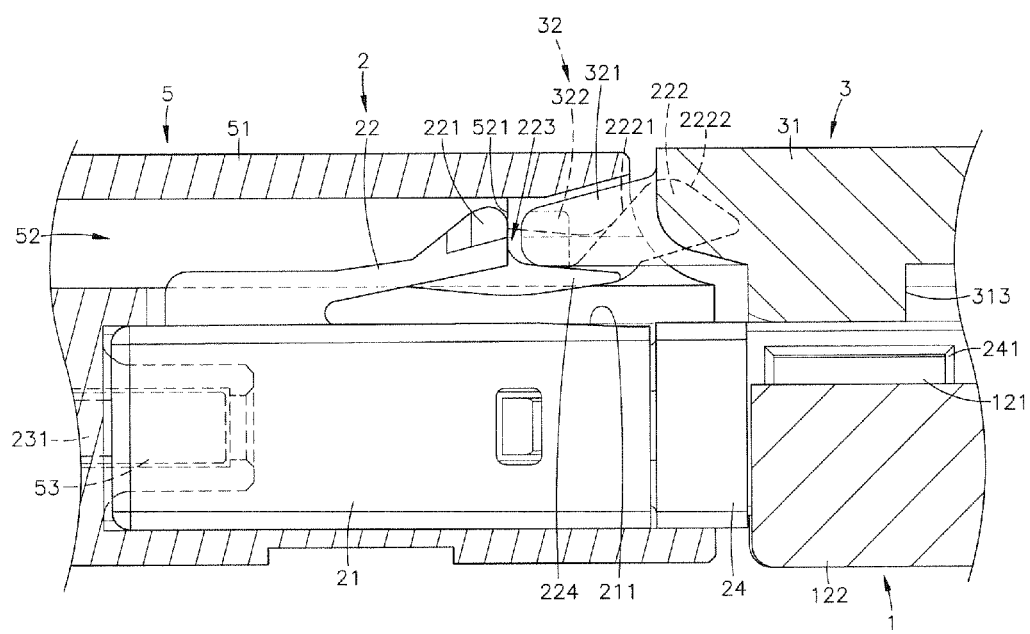
FIG. 4 is a schematic sectional side view of the present invention, illustrating disconnection of the optical fiber connector assembly from the mating optical fiber adapter (I).

Referring to FIGS. 1-4, an optical fiber connector assembly in accordance with a first embodiment of the present invention is shown. The optical fiber connector assembly comprises a receptacle 1, at least one, for example, two connectors 2, a sliding cover 3, and an operating member 4.

The receptacle 1 comprises a body shell 11, a partition wall 122 defined inside the body shell 11 on the middle, two accommodation grooves 12 defined in the body shell 11 and separated by the partition wall 122 for accommodating the connectors 2 respectively, two pairs of upright hook blocks 121 respectively bilaterally disposed in respective front ends of the two accommodation grooves 12 in the body shell 11, two longitudinal sliding grooves 111 extending along two opposite lateral sides of a bottom wall of the body shell 11, two locating grooves 112 respectively obliquely located on two opposite upright sidewalls of the body shell 11 on the middle, two stop blocks 13 respectively located at respective rear ends of the two upright sidewalls of the body shell 11 and respectively defining a front bearing surface 131 and a rear coupling groove 132, a cover shell 14 covered on the body shell 11 and comprising two coupling blocks 141 respectively engaged into the rear coupling grooves 132 of the stop blocks 13 and a bumper 142 disposed between the two coupling blocks 141 and kept in flush with the front bearing surfaces 131 of the stop blocks 13, and a cylindrical connection member 15 formed of two symmetrical halves and respectively connected to a middle part of a rear end of the body shell 11 and a middle part of a rear end of the cover shell 14 and defining therein an axial through hole 151 in communication with the accommodation grooves 12.

Each connector 2 comprises a connector housing 21, a clip 22, a calibration tube 23, an elastic member, for example, compression spring 233, a boot 24, and an optical fiber cable 25. The connector housing 21 comprises a cable hole 210 extending through opposing front and rear ends thereof, and a bevel surface 211 located on a top wall thereof and sloping downwardly backwards. The clip 22 is formed integral with and upwardly extended from the top wall of the connector housing 21 at a front side relative to the bevel surface 211, comprising two protruding retaining portions 221 respectively located at two opposite lateral sides thereof on the middle, a press rod 222 backwardly upwardly extended from a rear end thereof above the elevation of the protruding retaining portions 221, a recessed portion 223 located in a top wall thereof at a front side relative to the press rod 222, a pushing surface 2221 located on a front side of the press rod 222 and sloping upwardly backwards, an abutment surface 2222 located on an opposing rear side of the press rod 222 and sloping downwardly backwards from a top side of the pushing surface 2221, and a stop plate 224 extended from the periphery of the press rod 222 in junction with the recessed portion 223. The calibration tube 23 comprises a front ceramic tube 231 mounted in the cable hole 210 of the connector housing 21, and a rear guide tube 232 axially extended from a rear end of the front ceramic tube 231 and inserted into the boot 24. The boot 24 is mounted in one respective accommodation groove 12 in the body shell 11 of the receptacle 1, comprising two locating grooves 241 respectively located in two opposite lateral sides thereof and forced into engagement with the two upright hook blocks 121 in the respective accommodation groove 12 in the body shell 11 of the receptacle 1.

The optical fiber cable 25 comprises two optical fibers 251 respectively inserted through the boots 24 of the connectors 2 into the front ceramic tubes 231 and rear guide tubes 232 of the associating calibration tubes 23, an inner jacket 2521 surrounding the optical fibers 251, and an outer jacket 252 surrounding the inner jacket 2521 and inserted through the axial through hole 151 of the cylindrical connection member 15 to the outside of the body shell 11 of the receptacle 1 and kept in friction engagement with the inside wall of the cylindrical connection member 15.

The sliding cover 3 comprises a cover body 31, which comprises two sliding rails 312 respectively located at respective bottom sides of two downwardly extended side panels 311 thereof and respectively slidably coupled to two sliding grooves 111 in a bottom wall of the body shell 11 of the receptacle 1, a receiving chamber 30 defined in the cover body 31, a push unit 32, which comprises two horizontal suspension arms 321 forwardly located at a front side of the cover body 31, a cam 322 located at an inner lateral side of a front end of each horizontal suspension arm 321 and respectively positioned in the recessed portions 223 of the clips 22 of the two connectors 2 and two notches 323 located on a front edge of the top wall of the cover body 31 at one lateral side relative to the respective horizontal suspension arms 321 for receiving the press rods 222 of the clips 22 of the two connectors 2, a transverse groove 33 located in a top wall of the cover body 31 and extending through the topmost edge of one side panel 311 of the cover body 31, an exit hole 331 located in the topmost edge of one side panel 311 of the cover body 31 in one end of the transverse groove 33, a conical guide block 332 extending along one lateral side of the transverse groove 33, and a retaining structure 34, which comprises a positioning trough 340 located in a top wall of the cover body 31 at an opposite lateral side of the transverse groove 33 adjacent to the exit hole 331, a first rib 341 located in the positioning trough 340 and extending in a perpendicular direction relative to the transverse groove 33, and a sectional groove 342 extending across the first rib 341. Further, the elevation of the clips 22 of the two connectors 2 is below the topmost point of the sliding cover 3 so that the clips 22 will not protrude over the surface of the top wall of the sliding cover 3, avoiding impact damage upon sliding movement of the sliding cover 3 relative to the receptacle 1. Further, the configuration design of the receptacle 1 matches with the connectors 2 and the sliding cover 3, enabling the overall height of the optical fiber connector assembly to be minimized to satisfy the requirement for low profile application.

The operating member 4 comprises an actuation bar 41 slidably inserted into the transverse groove 33 of the sliding cover 3, a retaining block 411 perpendicularly extended from a bottom wall of one end of the actuation bar 41 and having a thickness larger than the thickness of the side panels 311 of the cover body 31, a position-limit groove 412 located in a front side of the retaining block 411 for abutment against the guide block 332, a stepped thrust groove 413 located in an opposing back side of the retaining block 411, a handle 42 horizontally extended from the actuation bar 41 at right angles and terminating in a grip 421, and an engagement unit 43, which comprises a second rib 431 located at the handle 42 adjacent to the retaining block 411 and a position-limit block 432 extended from the second rib 431 and engaged into the sectional groove 342.

The optical fiber connector assembly of the present invention is connectable to an optical fiber adapter 5, which comprises an adapter housing 51, two connector channels 52 defined in the adapter housing 51, an optical fiber sleeve 53 transversely inserted across the connector channels 52, and two retaining grooves 521 respectively located in the connector channels 52. It is to be understood that the number of the connector channels 52 is determined subject to the number of the connectors 2 of the optical fiber connector assembly, i.e., the optical fiber connector assembly can be configured to provide one single connector, two connectors or more than two connectors, and the optical fiber adapter is configured to provide one connector channel, two connector channels or more than two connector channels to mate with the optical fiber connector assembly. Because the optical fiber adapter 5 is a known device and not within the scope of the spirit of the present invention, no further detailed description in this regard will be necessary.

When in use, aim the connector housings 21 of the connectors 2 of the optical fiber connector assembly at the respective connector channels 52 in the adapter housing 51 of the optical fiber adapter 5, and then push the sliding cover 3 to move the sliding rails 312 forwardly along the respective longitudinal sliding grooves 111 in the body shell 11 of the receptacle 1 and to further force the connector housings 21 of the connectors 2 into the connector channels 52 in the adapter housing 51 of the optical fiber adapter 5. At this time, the protruding retaining portions 221 of the clips 22 of the connectors 2 will be forced by the inside wall of the adapter housing 51 of the optical fiber adapter 5 to elastically curve down. After the connector housings 21 of the connectors 2 have been inserted into the connector channels 52 in the adapter housing 51 of the optical fiber adapter 5 to the extent, the clips 22 immediately return to their former shape to force the protruding retaining portions 221 into engagement with the respective retaining grooves 521 in the adapter housing 51 of the optical fiber adapter 5 to lock the optical fiber connector assembly to the optical fiber adapter 5, achieving the effects of low insertion force and high anti-pull force. At the same time, the optical fibers 251 of the optical fiber cable 25 are guided by the respective calibration tubes 23 into the optical fiber sleeve 52 for alignment and connection to achieve the effects of low insertion loss and low return loss, assuring a high level of transmission performance.

Figure 5:
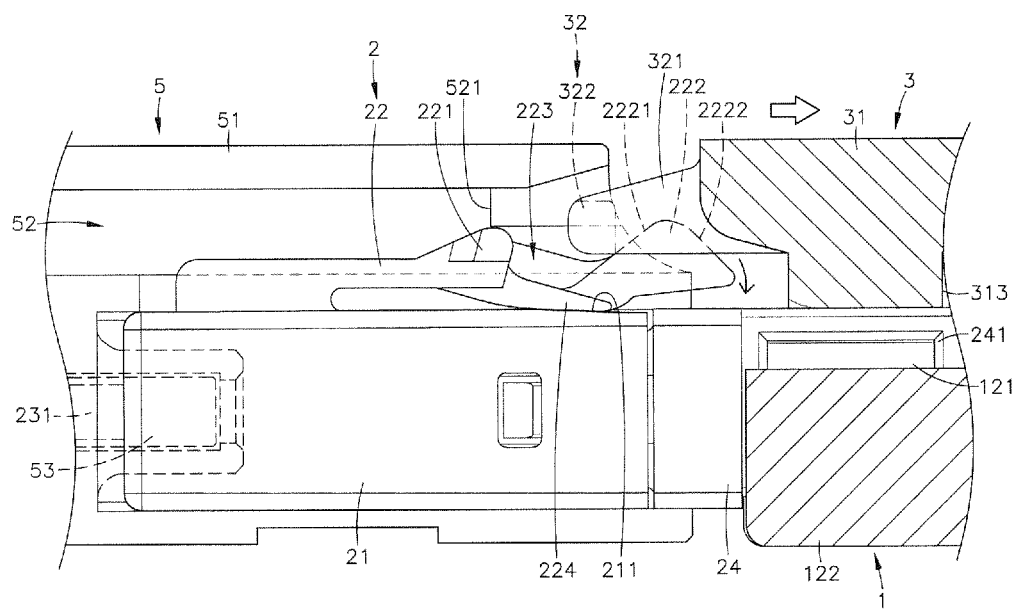
FIG. 5 is a schematic sectional side view of the present invention, illustrating disconnection of the optical fiber connector assembly from the mating optical fiber adapter (II).
Figure 6:
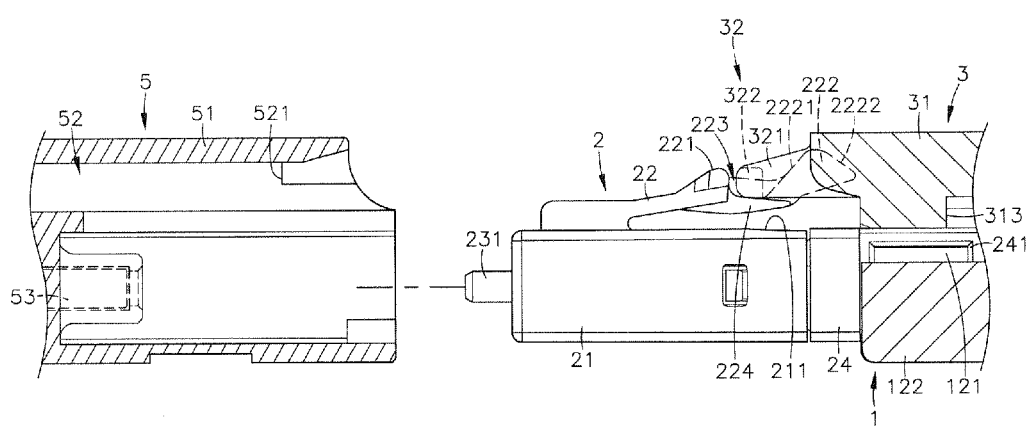
FIG. 6 is a schematic sectional side view of the present invention, illustrating disconnection of the optical fiber connector assembly from the mating optical fiber adapter (III).
Figure 7:
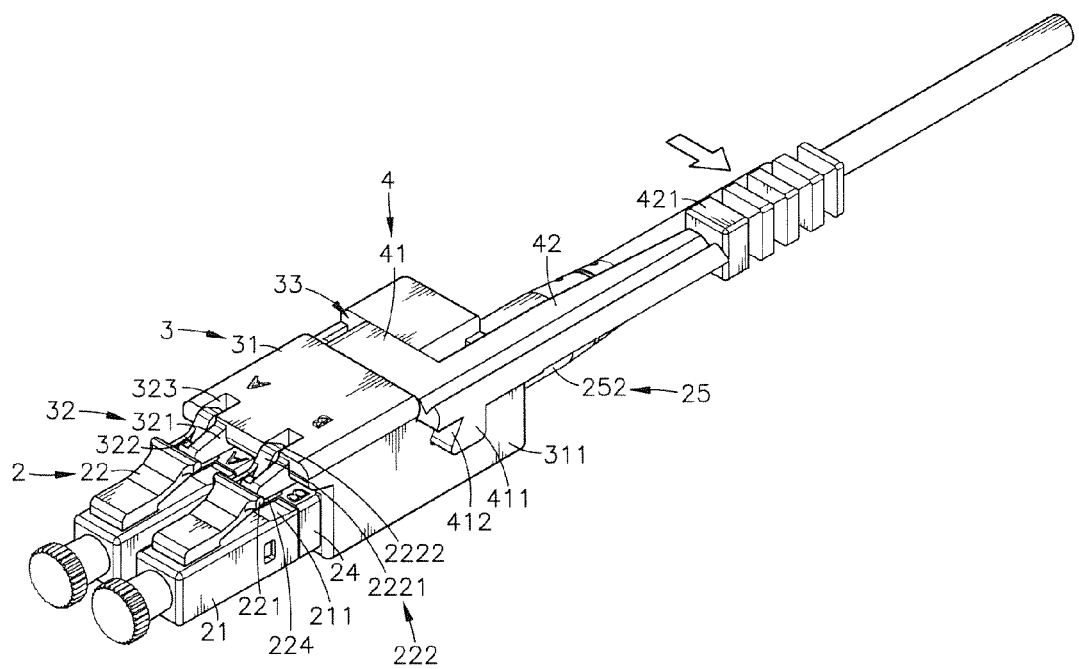
FIG. 7 corresponds to FIG. 1, illustrating the operating member moved sideways relative to the sliding cover.
Figure 8:
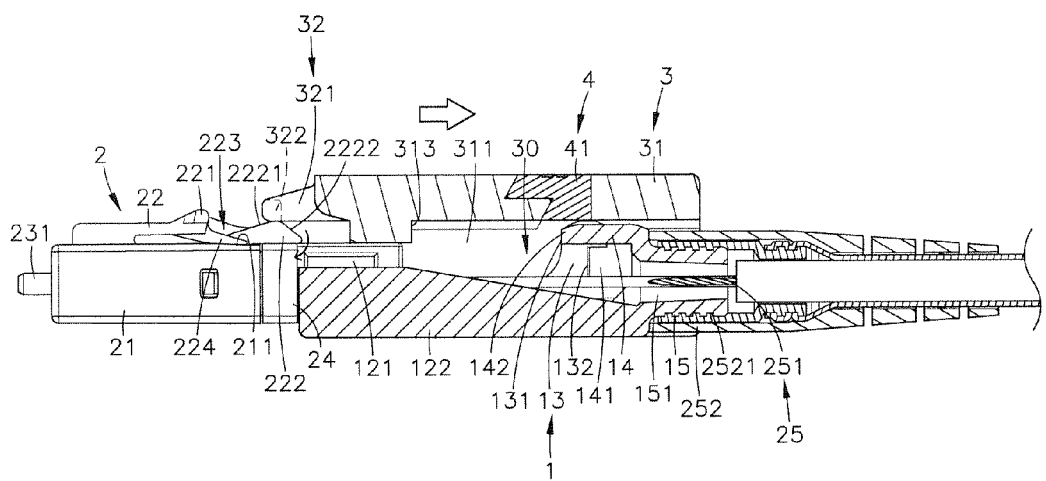
FIG. 8 is a schematic sectional side view of the present invention, illustrating the sliding cover moved backwards relative to the receptacle.
Figure 9:
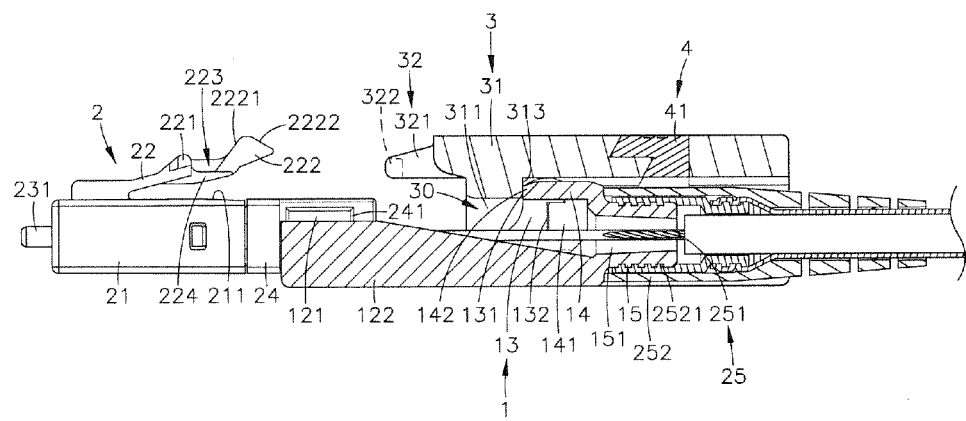
FIG. 9 corresponds to FIG. 8, illustrating the sliding cover opened from the receptacle.
Figure 10:
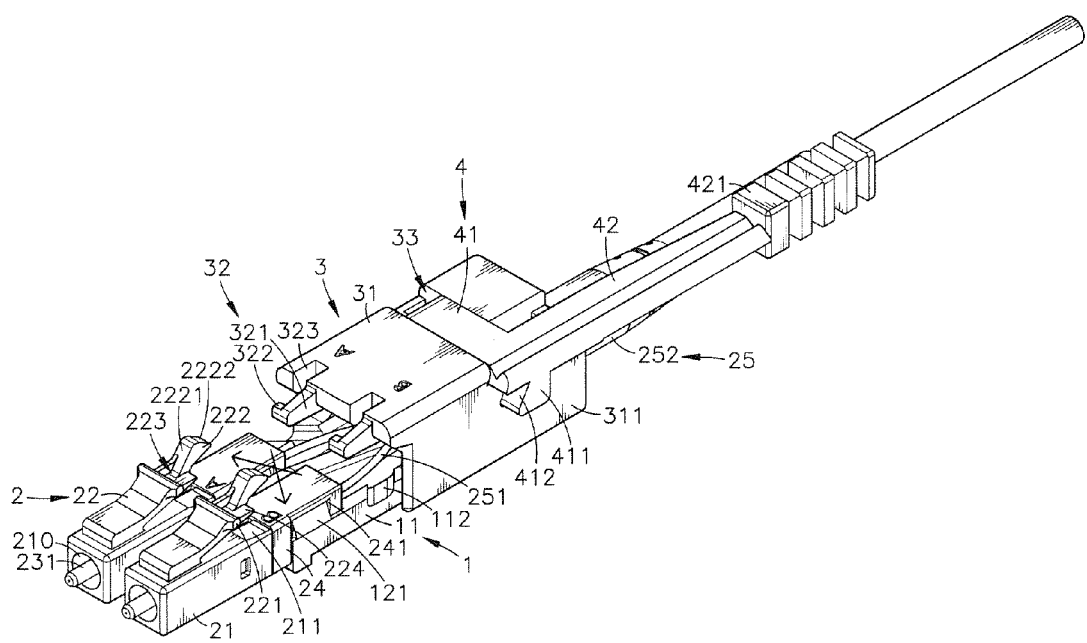
FIG. 10 is a schematic applied view of the present invention, illustrating the operation of the exchange of the positions of the two connectors of the optical fiber connector assembly (I).
Figure 11:
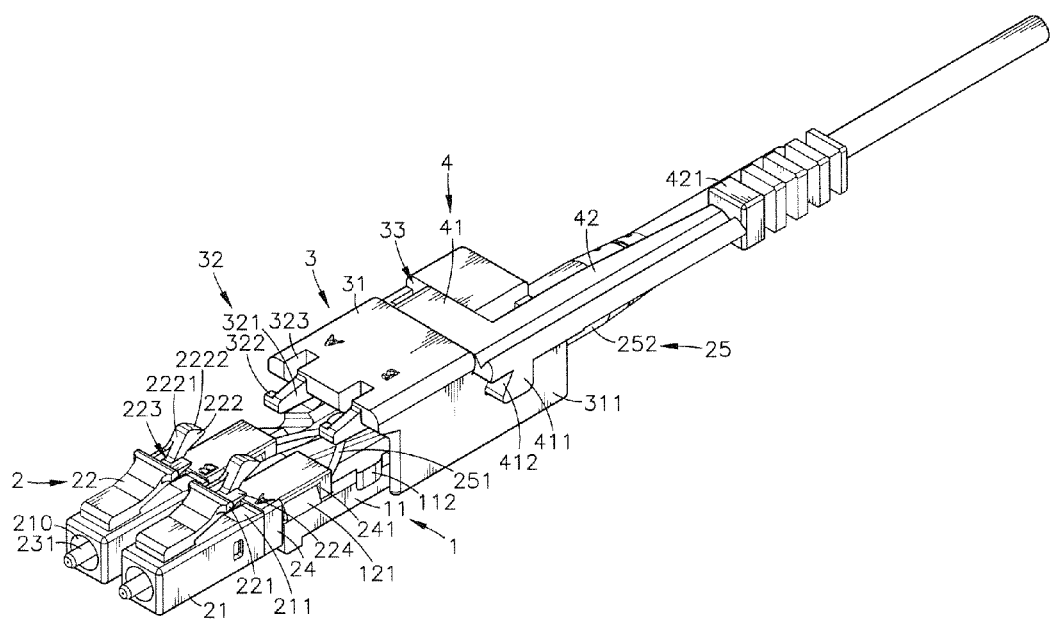
FIG. 11 is a schematic applied view of the present invention, illustrating the operation of the exchange of the positions of the two connectors of the optical fiber connector assembly (II).

Referring to FIGS. 5 and 6, when going to detach the connectors 2 of the optical fiber connector assembly from the optical fiber adapter 5, pull the sliding cover 3 to move the sliding rails 312 backwardly along the respective longitudinal sliding grooves 111 in the body shell 11 of the receptacle 1 and to further move the cams 322 of the push unit 32 over the pushing surfaces 2221 of the press rods 222 of the clips 22 of the respective connectors 2, thereby curving the protruding retaining portions 221 and causing the protruding retaining portions 221 to be disengaged from the respective retaining grooves 521 in the adapter housing 51 of the optical fiber adapter 5. At this time, the optical fiber connector assembly is unlocked from the optical fiber adapter 5, allowing the connector housings 21 of the connectors 2 to be moved out of the connector channels 52 in the adapter housing 51 of the optical fiber adapter 5. After removal of the optical fiber connector assembly from the optical fiber adapter 5, the clips 22 immediately return to their former shape. Thus, the optical fiber connector assembly can be disconnected from the optical fiber adapter 5 by means of pulling back the sliding cover 3 directly without needing to press the press rods 222 of the clips 22, simplifying the operation and saving much labor.

Further, because the cams 322 of the push unit 32 are stopped at the pushing surfaces 2221 of the press rods 222 of the clips 22 of the respective connectors 2, the press rods 222 of the clips 22 impart a resisting force to the sliding cover 3 to keep the sliding cover 3 in place. After the sliding cover 3 is moved backwardly relative to the receptacle 1 to the extent, the stepped thrust groove 413 of the retaining block 41 of the operating member 4 is forced into engagement with the front bearing surface 131 of one stop block 13 of the receptacle 1 to prevent the sliding cover 3 from falling out of the receptacle 1.

Referring to FIGS. 7-11, in application, the user can hold the grip 421 of the handle 42 of the operating member 4 and then move the operating member 4 leftward to slide the actuation bar 41 along the transverse groove 33 of the sliding cover 3 and to further carry the retaining block 411 out of the exit hole 331 of the transverse groove 33. At this time, the second rib 431 of the engagement unit 43 of the operating member 4 can be transversely moved over the first rib 341 of the retaining structure 34, and the position-limit block 432 can be moved through the sectional groove 342 of the first rib 341 to keep the stepped thrust groove 413 of the actuation bar 41 of the operating member 4 and the front bearing surface 131 of the respective stop block 13 of the receptacle 1 in a misalignment manner. At this time, the user can pull the grip 421 of the handle 42 of the operating member 4 backward to move the sliding cover 3 toward the optical fiber cable 25.

When pulling the operating member 4 to move the sliding cover 3, the cams 322 of the push unit 32 will force the press rods 222 of the clips 22 of the respective connectors 2 to elastically curve down, forcing the stop plate 224 of each clip 22 to stop against the bevel surface 211 of the associating connector housing 21. At this time, the cams 322 of the push unit 32 can then be moved over the pushing surfaces 2221 of the press rods 222 of the clips 22 of the respective connectors 2 to the extent where a stepped bearing surface 313 in the receiving chamber 30 of the sliding cover 3 is stopped against the front bearing surfaces 131 of the stop blocks 13 of the receptacle 1 and the bumper 142 of the cover shell 14 (see FIG. 3), exposing the connectors 2 to the outside of the body shell 11 of the receptacle 1 for interexchange of the two connectors 2.

Thereafter, lift the connector housing 21 of one connector 2 (marked with B) to disengage the two locating grooves 241 of the boot 24 from the two upright hook blocks 121 in the left-sided accommodation groove 12 of the receptacle 1, and then rest the respective optical fiber 251 in the left-sided locating groove 112, and then lift the connector housing 21 of the other connector 2 (marked with A) to disengage the two locating grooves 241 of the boot 24 from the two upright hook blocks 121 in the right-sided accommodation groove 12 of the receptacle 1 and insert the connector housing 21 of this A-marked connector 2 into the left-sided accommodation groove 12 to force the two locating grooves 241 of the boot 24 of this A-marked connector 2 into engagement with the two upright hook blocks 121 in the left-sided accommodation groove 12 of the receptacle 1, and then insert the connector housing 21 of the B-marked connector 2 into the right-sided accommodation groove 12 to force the two locating grooves 241 of the boot 24 of this A-marked connector 2 into engagement with the two upright hook blocks 121 in the right-sided accommodation groove 12 of the receptacle 1. Thus, the positions of the two connectors 2 are exchanged, completing exchange of the polarity of the two optical fibers 251 of the optical fiber cable 25.

Figure 12:
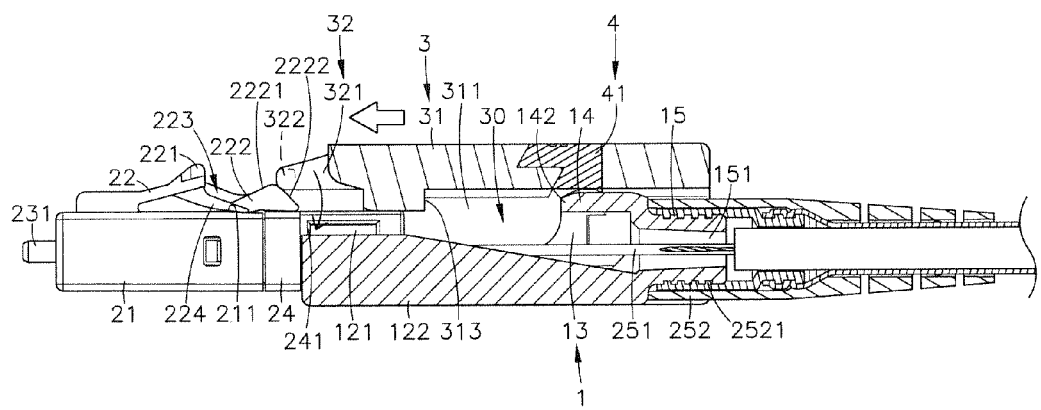
FIG. 12 is a schematic sectional side view of the present invention, illustrating the sliding cover return operation (I).
Figure 13:
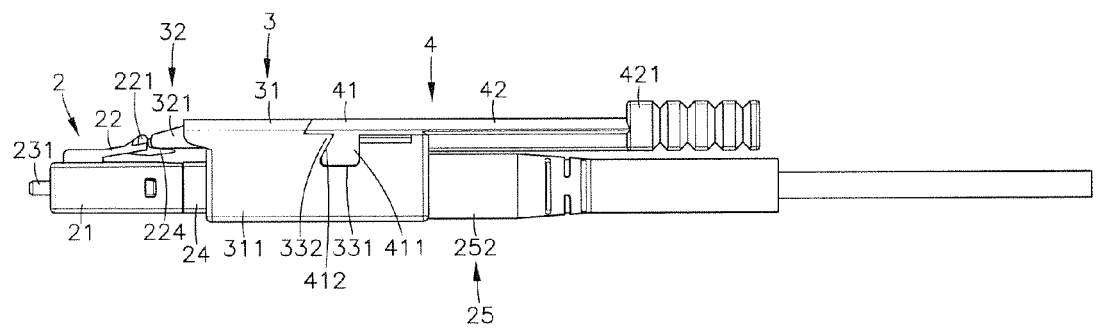
FIG. 13 is a schematic sectional side view of the present invention, illustrating the sliding cover return operation (II).
Figure 14:
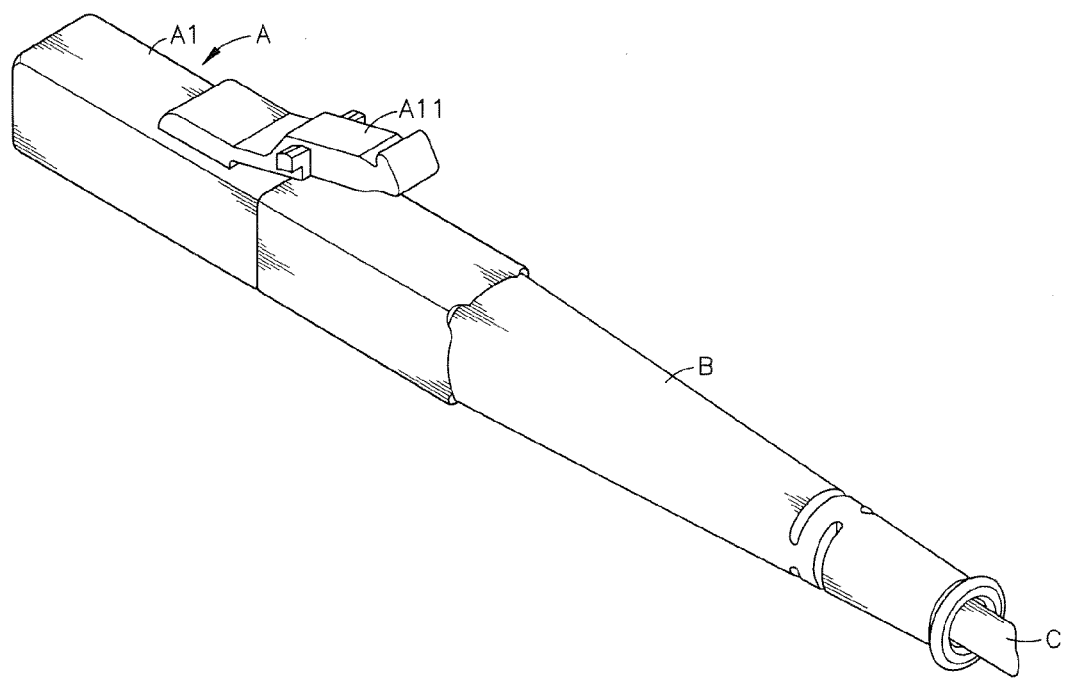
FIG. 14 is an elevational view of an optical fiber connector according to the prior art.
Figure 15:
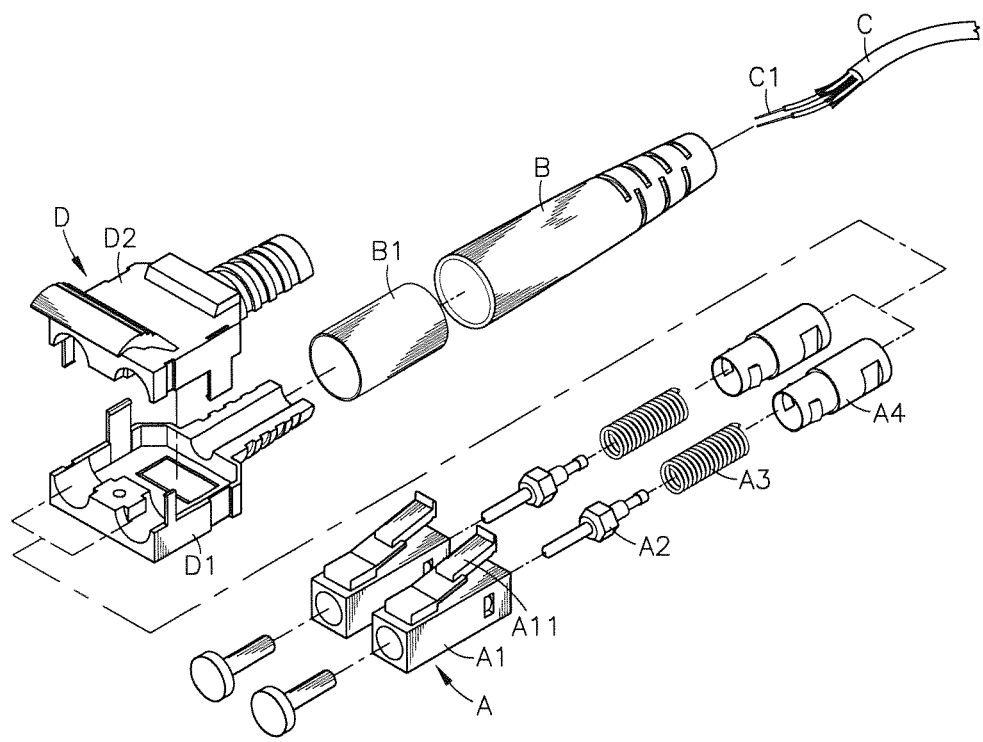
FIG. 15 is an exploded view of another design of optical fiber connector according to the prior art.
Figure 16:
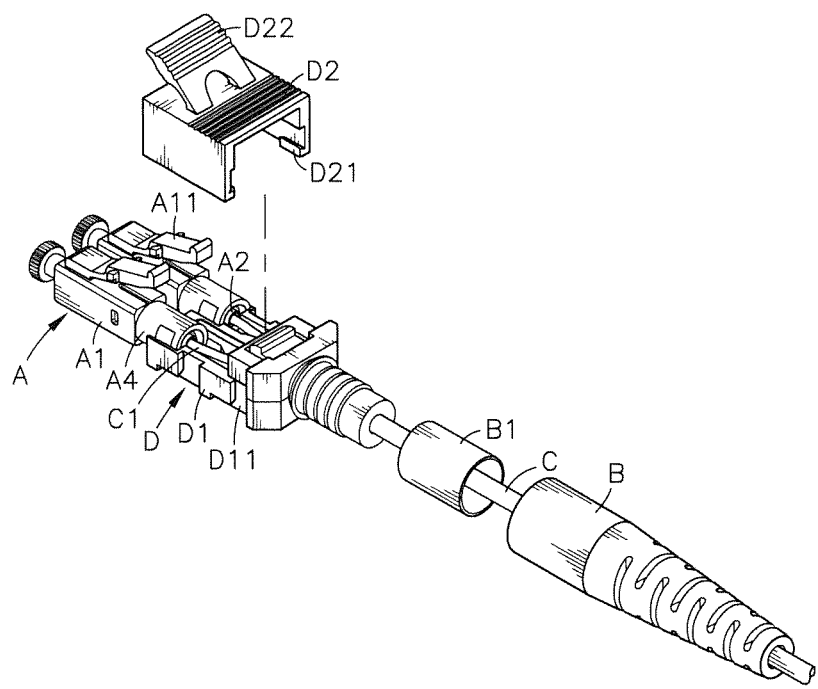
FIG. 16 is an exploded view of still another design of optical fiber connector according to the prior art.
Figure 17:
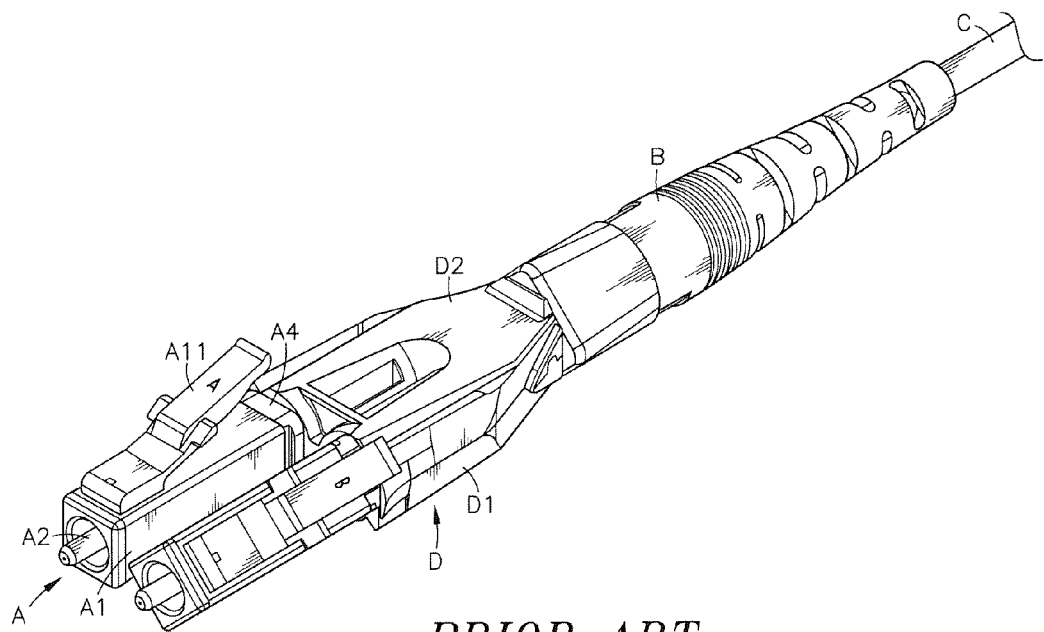
FIG. 17 is an exploded view of still another design of optical fiber connector according to the prior art.
Figure 18:
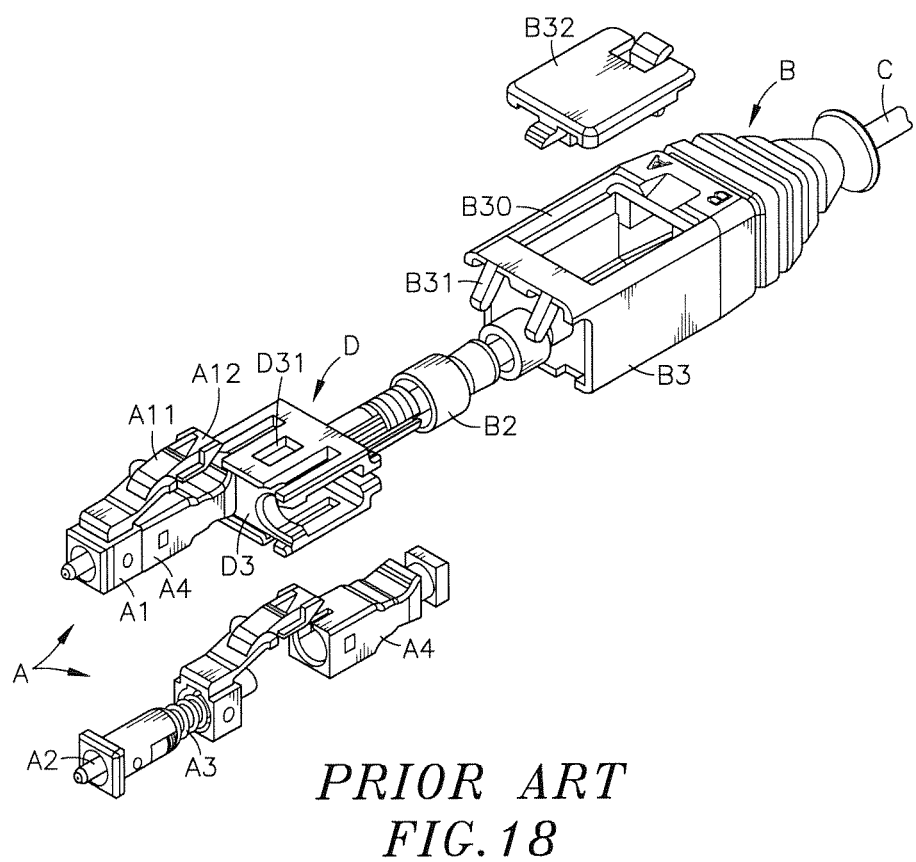
FIG. 18 is an exploded view of still another design of optical fiber connector according to the prior art.

Referring to FIGS. 12 and 13, when pushing back the grip 421 of the handle 42 of the operating member 4, the cams 322 of the push unit 32 of the sliding cover 3 will force the press rods 222 of the clips 22 of the respective connectors 2 to elastically curve down, forcing the stop plate 224 of each clip 22 to stop against the bevel surface 211 of the associating connector housing 21. At this time, the cams 322 of the push unit 32 can then be moved over the abutment surfaces 2222 of the press rods 222 of the clips 22 of the respective connectors 2 to the extent where the cams 322 of the push unit 32 are rested in the recessed portions 223 of the clips 22 of the respective connectors 2. At this time, move the operating member 4 rightwards to move the actuation bar 41 along the transverse groove 33 of the sliding cover 3 to the extent where the stepped thrust groove 413 of the retaining block 41 of the operating member 4 is forced into engagement with the front bearing surface 131 of one stop block 13 of the receptacle 1 to prevent the sliding cover 3 from falling out of the receptacle 1, enhancing structural stability. Thus, the invention facilitates exchange of the polarity of the optical fibers 251 of the optical fiber cable 25.

Referring to FIGS. 2, 5, 7, 9, 10 and 12 again, the invention provide an optical fiber connector assembly, which is characterized by the arrangement of the connector housings 21 of the connectors 2 in the respective accommodation grooves 12 in the body shell 11 of the receptacle 1, the arrangement of the calibration tube 23 of each connector 2 in the associating connector housing 21 and boot 24 for the mounting of one respective optical fiber 251 of the optical fiber cable 25, the design of the protruding retaining portion 221 and press rod 222 of the clip 22 at the connector housing 21 of each connector 2, and the arrangement of the sliding cover 3 on the receptacle 1 to let the cams 322 at the horizontal suspension arms 321 of the push unit 32 be positioned in the recessed portions 223 adjacent to the press rods 222 of the clips 22 of the connectors 2. Thus, when the user pulls the sliding cover 3 backwards with one single hand, the cams 322 of the push unit 32 will be moved over the abutment surfaces 2222 of the press rods 222 of the clips 22 of the respective connectors 2 to elastically deform the press rods 222 and to further disengage the protruding retaining portions 221 of the clips 22 from the respective retaining grooves 521 in the adapter housing 51 of the optical fiber adapter 5 for allowing removal of the optical fiber connector assembly out of the optical fiber adapter 5 with less effort.

Further, the actuation bar 41 of the operating member 4 is slidably coupled to the transverse groove 33 in the top wall of the cover body 31 of the sliding cover 3. The user can hold the grip 421 of the handle 42 of the operating member 4 to move the retaining block 411 of the operating member 41 out of alignment with the respective stop block 13 of the body shell 11, and then pull the operating member 4 to move the sliding cover 3 backwardly relative to the body shell 11 of the receptacle 1 so that the push unit 32 can be moved over the press rods 222 of the clips 22 of the respective connectors 2 to expose the connectors 2 to the outside of the body shell 11 for allowing exchange of the positions of the connectors 2 to change the polarity of the two optical fibers 251 of the optical fiber cable 25.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An optical fiber connector assembly, comprising:
   a receptacle comprising a body shell and at least one accommodation groove defined in said body shell;
   an optical fiber cable comprising at least one optical fiber;
   at least one connector respectively accommodated in said at least one accommodation groove of said receptacle and insertable into a respective connector channel in an adapter housing of an optical fiber adapter, each said connector comprising a connector housing insertable into one said connector channel of said optical fiber adapter, a clip formed integral with and upwardly extended from a top wall of said connector housing, said clip comprising two protruding retaining portions respectively located at two opposite lateral sides thereof on the middle of each of the two opposite lateral sides of the clip for engagement with respective retaining grooves in the respective said connector channel of said optical fiber adapter, a press rod backwardly upwardly extended from a rear end thereof and a recessed portion located in a top wall thereof at a front side relative to said press rod, a calibration tube mounted in said connector housing for holding one respective said optical fiber of said optical fiber cable, and a boot surrounding a rear part of said calibration tube and connected to a rear side of said connector housing; and a sliding cover slidably coupled to said receptacle for covering said at least one connector in said receptacle, said sliding cover comprising a cover body movable relative to said receptacle between a closed position to keep said at least one connector from sight and an open position to expose said at least one connector to the outside of said receptacle, a push unit located at a front side of said cover body and adapted for pressing said clip of one said connector, said push unit comprising at least one horizontal suspension arm and a cam located at one side of a front end of each said horizontal suspension arm for positioning in said recessed portion of said clip of one said connector, each said cam being moved over said press rod of said clip of one respective said connector to elastically deform said clip and to disengage said clip from the respective said retaining groove of said optical fiber adapter when said sliding cover is pulled backwards relative to said receptacle;

wherein said body shell of said receptacle further comprises two sliding grooves respectively longitudinally extending along two opposite lateral sides of a bottom wall thereof; said receptacle further comprises two stop blocks respectively located at respective rear ends of two upright sidewalls of said body shell and respectively defining a front bearing surface; said sliding cover further comprises two sliding rails respectively located at respective bottom sides of two downwardly extended side panels thereof and respectively slidably couple to said sliding grooves of said body shell of said receptacle, a receiving chamber defined in said cover body, and a stepped bearing surface defined in said receiving chamber for stopping against the front bearing surfaces of said stop blocks of said receptacle; and each said stop block of said receptacle further defines a rear coupling groove; said receptacle further comprises a cover shell covered on said body shell, said cover shell comprising two coupling blocks respectively engaged into the rear coupling grooves of the two stop blocks of said receptacle and a bumper disposed between said two coupling blocks and kept in flush with the front bearing surfaces of said stop blocks of said receptacle.

2. The optical fiber connector assembly as claimed in claim 1, wherein said receptacle further comprises a partition wall defined inside said body shell between two said accommodation grooves, and a pair of upright hook blocks bilaterally disposed in front end of each said accommodation grooves; said boot of each said connector comprises two locating grooves located in two opposite lateral sides thereof for engagement with the pair of upright hook blocks in one respective said accommodation groove.

3. The optical fiber connector assembly as claimed in claim 2, wherein said receptacle further comprises two locating grooves respectively obliquely located on two opposite upright sidewalls of said body shell.

4. The optical fiber connector assembly as claimed in claim 1, wherein said calibration tube of each said connector is loaded with a compression spring, comprising a front ceramic tube mounted in said connector housing and a rear guide tube axially extended from a rear end of said front ceramic tube and inserted into the associating said boot.

5. The optical fiber connector assembly as claimed in claim 1, wherein said receptacle further comprises a cylindrical connection member formed of two symmetrical halves and respectively connected to a middle part of a rear end of said body shell and a middle part of a rear end of said cover shell, said cylindrical connection member defining therein an axial through hole in communication with said accommodation grooves of said receptacle; said optical cable further comprises an inner jacket surrounding said at least one optical fiber, and an outer jacket surrounding said inner jacket and inserted through said axial through hole of said cylindrical connection member to the outside of said body shell of said receptacle.

6. The optical fiber connector assembly as claimed in claim 1, further comprising an operating member for moving said sliding cover, wherein said cover body of said sliding cover comprises a transverse groove located in a top wall thereof; said operating member comprises an actuation bar slidably inserted into said transverse groove of said sliding cover, a retaining block perpendicularly extended from a bottom wall of one end of said actuation bar and a handle horizontally extended from said actuation bar at right angles and terminating in a grip.

7. The optical fiber connector assembly as claimed in claim 6, wherein said sliding cover further comprises an exit hole located in the topmost edge of one said side panel of said cover body in one end of said transverse groove, and a conical guide block extending along one lateral side of said transverse groove; said retaining block of said operating member has a thickness larger than the thickness of said side panels of said cover body; said operating member further comprises a position-limit groove located in a front side of said retaining block for abutment against said conical guide block of said sliding cover, and a stepped thrust groove located in an opposing back side of said retaining block for stopping against said stop blocks of said receptacle.

8. The optical fiber connector assembly as claimed in claim 6, wherein said cover body of said sliding cover further comprises a retaining structure located in the top wall thereof at a rear side relative to said transverse groove, said retaining structure comprising a positioning trough, a first rib located in said positioning trough and extending in a perpendicular direction relative to said transverse groove, and a sectional groove extending across said first rib; said operating member further comprises an engagement unit, said engagement unit comprising a second rib located at said handle for abutment against said first rib and a position-limit block extended from said second rib for engagement into said sectional groove in said first rib.

9. The optical fiber connector assembly as claimed in claim 1, wherein said clip of each said connector further comprises said two protruding retaining portions respectively located at said two opposite lateral sides thereof on the middle of each of the two opposite lateral sides of the clip below the elevation of the associating said press rod, a pushing surface located on a front side of said press rod and sloping upwardly backwards, an abutment surface located on an opposing rear side of said press rod, and a stop plate extended from the periphery of said press rod in junction with said recessed portion.

10. The optical fiber connector assembly as claimed in claim 1, wherein said sliding cover further comprises at least one notch located on a front edge of a top wall of said cover body at one lateral side relative to one respective said horizontal suspension arm for receiving said press rod of said clip of each said connector.

\* \* \* \* \*